Jan. 5, 1932.   J. S. LANG   1,840,273
FISHING LURE
Filed Nov. 6, 1929   2 Sheets-Sheet 1
Fig.1.
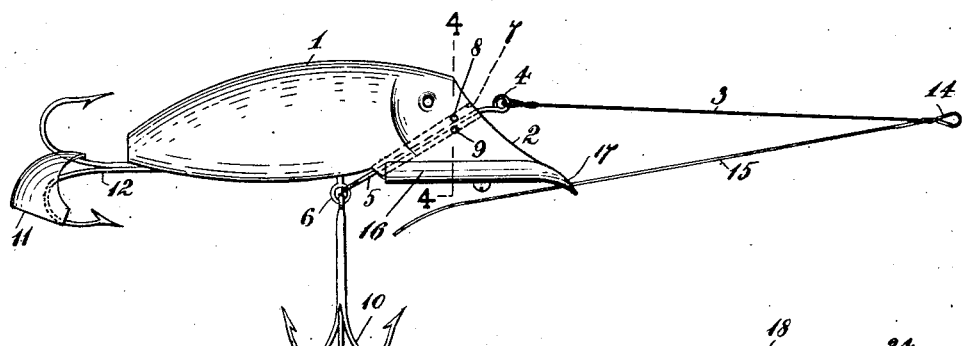
Fig.5.
Fig.2.
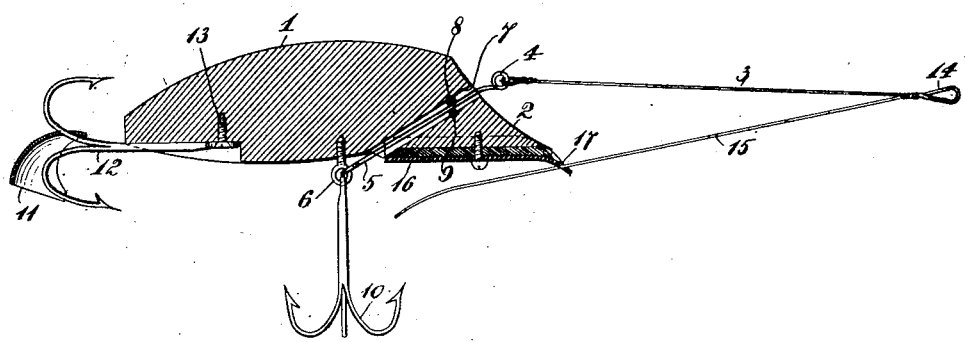
Fig.3.
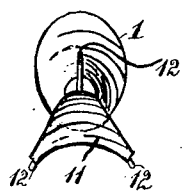
Fig.4
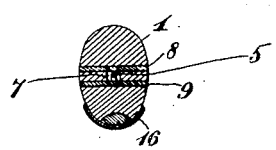
INVENTOR:
James S. Lang
By John E. R. Hayes
ATTORNEY:

Jan. 5, 1932.  J. S. LANG  1,840,273
FISHING LURE
Filed Nov. 6, 1929    2 Sheets-Sheet 2
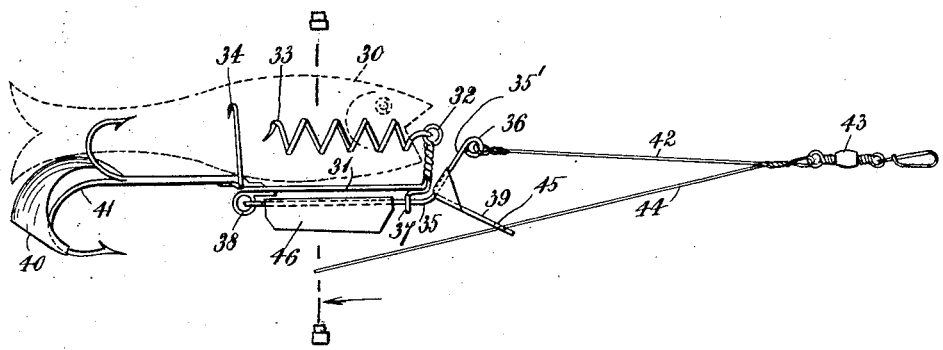
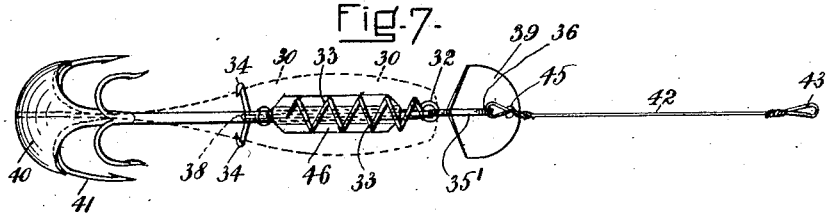
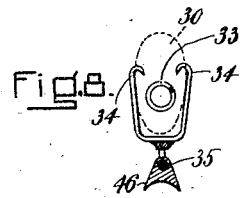
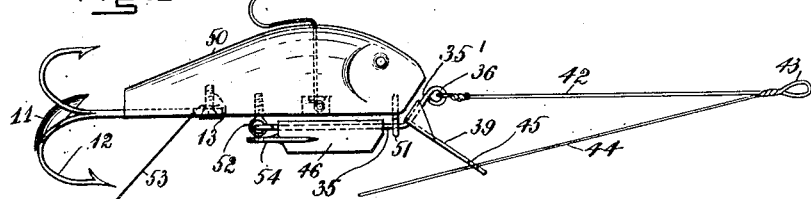
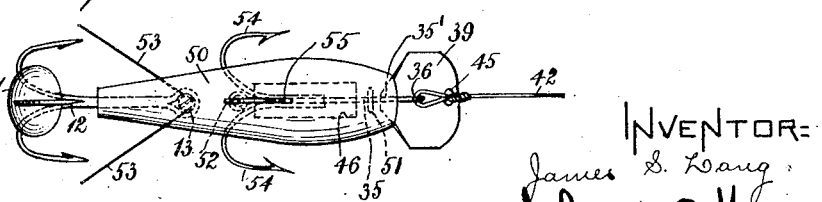
INVENTOR:
James S. Lang
By John E. R. Hayes
ATTORNEY Patented Jan. 5, 1932

1,840,273

UNITED STATES PATENT OFFICE

JAMES S. LANG, OF BOSTON, MASSACHUSETTS; OLD COLONY TRUST COMPANY, OF BOSTON, MASSACHUSETTS, EXECUTOR OF SAID JAMES S. LANG, DECEASED

FISHING LURE

Application filed November 6, 1929. Serial No. 405,106.

The present invention relates to fishing lures adapted to be drawn or trolled through the water in an attempt to attract the attention of fish. It especially relates to that class of lures which when drawn through the water have an oscillatory, rolling or diving motion or a combination of these motions imparted to them by the action of the water upon them.

The essential object of the invention is to provide a fishing lure having much greater amplitude of oscillation and greater range of working speed than those heretofore in use. Another object is to secure better visibility by an efficient arrangement of reflecting surfaces. Another object is to provide an improved means for attaching certain resistance blades or rudders to the body of the lure. A further object is to provide an efficient weed guard for the forward end of the lure, also to so arrange the hooks that they may be readily mistaken for fish fins.

The different features of the invention may be seen by referring to the drawings in which:—

Figure 1 is a side elevation of a well known type of lure to which some of the features of the invention have been applied.

Fig. 2 is a longitudinal cross section of the lure shown in Fig. 1.

Fig. 3 is a rear view of the same.

Fig. 4 is a cross section on the line 4—4 of Fig. 1.

Fig. 5 is a side elevation of another well known type of lure to which the invention has been applied.

Fig. 6 is a side elevation of another embodiment of the invention in which a dead fish is used as the body of the lure.

Fig. 7 is a plan of the lure shown in Fig. 6.

Fig. 8 is a cross section on the line 8—8 of Fig. 6.

Fig. 9 is a side elevation of a further embodiment of the invention; and

Fig. 10 is a plan of the lure shown in Fig. 9.

In the oscillatory lures heretofore in use the line or leader is attached to an eye or fixture rigidly attached to or forming an integral part of the lure body near its front end, and oscillatory movement is obtained by the action of the water either upon a certain portion of the lure body especially shaped with that end in view, or upon resistance blades attached to the lure body. I have discovered that if the force exerted to draw the lure through the water is applied to an eye or fixture rigidly secured to the front end of the lure it has a tendency to prevent the front end of the lure from oscillating and therefore to dampen out the oscillations of the lure as a whole. In order to prevent this and to increase the amplitude of the oscillations I provide the lure with an eye or fixture which, instead of being fixed with relation to the front end of the lure body, is so arranged that the fore part of the lure body is capable of a limited lateral movement with relation to it. An example of this is shown in Fig. 1 in which 1 is a lure body of a conventional type having a hollowed face 2 by which the lure is acted upon by the water as it is drawn through it. The lure is drawn through the water by attachment of a leader wire 3 to a draw eye 4 lying just forward of the body of the lure. The draw-eye is borne by the forward end of a traction member 5, the rear end of which is looped to loosely connect with a fixture or screw-eye 6 lying back of the forward end of the lure body and preferably attached to the body about midway the body on the under side thereof.

In forming this connection the traction member 5 loosely passes through a hole 7 of a larger diameter than the traction member and bored from the front face of the lure rearwardly to the point of the fixture or screw-eye 6 on the under side of the lure. Crossing the hole 7 near the forward end of the lure body are two transverse pins 8 and 9, respectively, above and below the traction member 5, and upon these pins the lure body is movable with relation to the traction member. With parts thus arranged the fore part of the lure body is capable of a limited lateral movement with relation to the traction member and draw-eye carried by it. This movement is limited in extent by the sides of the hole 7 which, as before described, is of larger diameter than that of the traction member 5. The movement of the lure body with respect to the traction member is facilitated by means of the pins 8 and 9 between which the traction member extends and which act as guides therefor. If it is desired a set of belly-hooks 10 may be attached to the eye 6.

Co-operating with the traction member 5 is a resistance blade or rudder 11, preferably concave as shown, soldered or otherwise attached to a rear set of triple hooks 12, which is rigidly attached to the body of the lure by the screw 13. The position of blade 11 is such that the chordal plane of the major part of its effective surface has a downward and backward inclination from the axis of the body of the lure.

The leader wire 3 is provided at its forward end with a loop 14 for line attachment. Connecting with the leader wire and preferably with the loop at its forward end is a wire 15 turned downwardly and rearwardly to form a weed guard. The under side of the lure body at the forward end portion thereof is provided with a reinforcing plate 16 having a forward downwardly turned end and the wire 15 forming the weed guard passes through an opening or eye 17 in this plate with a free slidable fit therein.

In operation, the reaction of the water upon the inclined face 2 and the blade 11 causes the front end of the lure to incline downward and to oscillate rapidly laterally in a manner resembling the swimming of a live fish. This action takes place to an extraordinary degree for the reason that the fore part of the lure body is free to move laterally with reference to the draw eye 4, and its oscillations are not dampened by the tractive force as would be the case if the eye were attached rigidly to the front end of the lure.

In Fig. 5 the application of this same principle to another well known form of oscillatory lure is shown. Here the lure body 18 has attached to its under side a strip of metal 19 bearing a diving blade 20 at its forward end and a downwardly and backwardly inclined blade 21 at its rear end. The forward blade 20 is perforated to form an eye or bearing 22 through which passes a bent traction member 23. The upwardly turned forward end 23 of this traction member is provided with a draw eye 24 for the attachment of the line or leader 25 and its rear end is loosely looped through the screw eye 27 which is screwed into the body of the lure.

The traction member 23 carrying the draw-eye 24 thus being loosely retained with relation to the lure body, said body and especially the fore part thereof, is capable of a limited lateral movement with relation to the draw-eye, and this afforded movement allows the body of the lure to oscillate with greater freedom and amplitude than would be the case if the leader wire or line were attached directly to the front end of the lure body.

In Figs. 6, 7 and 8 an attached dead fish 30 constitutes the body of the lure. This body is born by a frame 31 the front end of which is upturned and bears a loop 32 into which is linked the end of a helical fish holder 33. The body of the lure or fish is otherwise supported and retained by a pair of upturned elastic retaining hooks 34 fixed to the frame. 35 is the traction member having an upturned end 35' bearing a draw-eye 36. The traction member is passed through a depending eye 37 at the forward end of the frame forming a bearing for it and within which the traction member may have rotary oscillation. At its rear end the traction member is looped into an eye 38 fixed to the frame at a point well back of the forward end of the fish or lure when borne by the frame and preferably at a point about midway thereof. The traction member has affixed to it a downwardly and forwardly extending resistance blade 39. At its rear end the frame 31 is provided with a rear resistance blade 40 borne by a set of hooks 41 on the rear end of the frame. 42 is the leader wire attached to the draw eye 36 and to which the line is attached through a connection 43. 44 is the weed guard passing through a perforation 45 in the forward resistance blade 39.

In attaching the body of the lure the helical fish holder 33 is raised from its normal position, inserted into the mouth of the fish and screwed into the fish body after which the body is pressed down between the elastic retaining hooks 34, thus holding it firmly in its proper relation to the rest of the lure. When the body is thus in place the lure will function substantially as in the construction first described.

In the embodiment of the invention just described the traction member 35 is shown provided with a pair of reflecting surfaces 46 preferably highly colored. These surfaces form with each other an upwardly pointing dihedral angle and are so arranged that light coming from the near vertical will be reflected through the water in an approximately horizontal direction, or if the surfaces are brightly colored they will become effectively illuminated by light coming from above for attracting the attention of fish to the lure from a distance.

A further and preferred embodiment of the invention is shown in Figures 9 and 10 in which an artificial image 50 of conventionalized fish form comprises the body of the lure. Attached to this body on the under side thereof, one at the forward end of the body beneath the head and the other about midway the body, are screw-eyes 51 and 52, respectively. The traction member 35 with attachments (all substantially as shown in the construction last described) is connected to these screw-eyes, the traction member extending through the screw-eye 51 and making loose connection at its rear end with the screw-eye 52 so that the lure body may oscillate with relation to the draw-eye 36 carried by the traction member. Rigidly attached to the body by a binding screw 13 (substantially the same as shown in Fig. 1) is a gang of tail hooks 12. The rear resistance blade 11 is borne by these hooks with arrangement substantially as shown in Fig. 1, the exception being that the blade is one of relatively small size and preferably has the form of a concave disk, the chordal plane of which has a backward and downward inclination. Fastened to the binding screw 13, which secures the rear or caudal gang of hooks, is a weed guard 53 for these hooks. The guard consists simply of a bent wire the free ends of which extend backward and downward, while the centre is bent into the form of a loop by which the guard may be secured by the binding screw. The traction member is also preferably provided with a pair of ventral hooks 54 rigidly secured to it and extending laterally from it. Thus extending, these ventral hooks lie well in back of the weed guard 44 and so are less inclined to catch than are the usual pendent ventral gang of hooks 10 as shown in Fig. 1. If desired, a back or dorsal hook 55 may be either rotatably or rigidly inserted in, or otherwise, attached to the back of the body. The general operation is the same as before described.

The term "oscillate" or "oscillatory" as used herein is used in the sense of wiggling or waggling.

Having thus fully described my invention, I claim and desire to secure by Letters Patent of the United States:—

1. A fishing lure having on the under side thereof light reflectors forming with each other an upwardly-pointed dihedral angle with inclination whereby light coming from above will be reflected in a general lateral direction by them.

2. In a fishing lure having means for imparting an oscillatory movement to the body of the lure when drawn through water, and with a draw member for line attachment arranged at the forward end of the lure; the combination therewith of a traction member extending beneath the body of the lure from a point back of the forward end thereof and provided with an upturned end to which said draw member is secured, means for securing said traction member to said body whereby the body will have a limited lateral movement with relation to the draw-eye when the lure is being drawn through water with oscillatory movement, and light reflectors borne by said traction member forming with each other and upwardly-pointed dihedral angle with inclination whereby light coming from above will be reflected in a general lateral direction by them.

3. In a fishing lure having means for imparting an oscillatory movement to the body of the lure when drawn through water, and with a draw member for line attachment arranged at the forward end of the lure; the combination therewith of a traction member extending beneath the body of the lure from a point back of the forward end thereof and provided with an upturned end to which said draw member is secured, means for securing said traction member to said body whereby the body will have a limited lateral movement with relation to the draw-eye when the lure is being drawn through water with oscillatory movement, and a set of ventral hooks rigidly secured to said traction member and extending laterally from it.

4. In a fishing lure having means for imparting an oscillatory movement to the lure when drawn through water, and with a draw-eye for line attachment; the combination therewith of means for loosely connecting said draw-eye to the body of the lure with attachment to said body at a point lying back of the fore end of said body whereby said body of the lure will move with relation to the draw-eye when the lure is being drawn through water with oscillatory movement.

5. In a fishing lure having means for imparting an oscillatory movement to the lure when drawn through water, and with a draw-eye for line attachment; the combination therewith of a movable traction member to which said draw-eye is secured, and means for loosely connecting said traction member to the body of the lure with attachment at a point lying back of the fore end of the lure body whereby said body of the lure will have a limited movement with relation to said draw-eye when the lure is being drawn through water with oscillatory movement.

6. In a fishing lure having means for imparting an oscillatory movement thereto, the combination comprising the body of the lure having an opening through it extending from the front end of the lure to a point rearward of said front end, a traction member extending loosely through said opening, a draw-eye secured to the forward end of the traction member, and means for attaching the rear end of the traction member to the lure body whereby said body of the lure will have a limited movement with relation to said draw-eye when the lure is being drawn through water with oscillatory movement.

7. In a fishing lure having means for imparting an oscillatory movement to the lure when drawn through water, and with a draw-eye for line attachment, the combination therewith of a movable traction member extending along beneath the body of the lure with forward end upturned, and to which upturned forward end of the traction member the draw-eye is secured, and means for securing said traction member whereby the body of the lure will move relatively to the draw-eye when the lure is being drawn through water with oscillatory movement.

8. In a fishing lure having means for imparting an oscillatory movement thereto when drawn through water including a forwardly and downwardly inclined diving blade, and a draw member for line attachment; the combination therewith comprising a traction member extending beneath the body of the lure and through said diving blade with loose bearing therein and with forward end upturned, and to which upturned forward end of the traction member the draw-eye is secured, and means for otherwise fixing said traction member whereby the body of the lure will have limited movement with relation to the draw-eye when the lure is being drawn through water with oscillatory movement.

9. In a fishing lure having at its forward end a draw member, a diving blade having an opening through it adjacent the bottom edge of the blade, and a lead wire secured to the draw member; the combination therewith comprising a weed deflecting guard connecting with a lead wire at the forward end thereof with inclination backward and through the said opening in the diving blade with extension back of said blade.

JAMES S. LANG.